United States Patent [19]

Webb

[11] Patent Number: 4,806,836

[45] Date of Patent: Feb. 21, 1989

[54] ANTI-RESET WINDUP FOR CONTROLLERS IN SELECTIVE CONTROL LOOPS

[75] Inventor: Don W. Webb, Bartlesville, Okla.

[73] Assignee: Applied Automation, Inc., Bartlesville, Okla.

[21] Appl. No.: 143,784

[22] Filed: Jan. 14, 1988

[51] Int. Cl.⁴ ............................................. G05B 11/36
[52] U.S. Cl. .................................... 318/609; 318/610; 364/161
[58] Field of Search ................. 318/609, 610; 364/161

[56] References Cited

U.S. PATENT DOCUMENTS

| | | | |
|---|---|---|---|
| 3,938,017 | 2/1976 | Hayes | 318/610 |
| 4,175,283 | 11/1979 | Buchwald | 364/161 |
| 4,236,202 | 11/1980 | Giles et al. | 364/105 |
| 4,268,784 | 5/1981 | Ganaway | 318/610 |
| 4,303,873 | 12/1981 | Hawkins | 318/301 |

Primary Examiner—William M. Shoop, Jr.
Assistant Examiner—Saul M. Bergmann
Attorney, Agent, or Firm—George E. Bogatie

[57] ABSTRACT

A tuning adjustment for a PI controller is disclosed which produces a desired response for a controlled variable in a selective control loop having an external reset feedback signal for anti-reset-windup protection. The desired control effect is evident in the time response of the controlled variables return to set point when a select switches signals and suddenly selects an output limited PI controller to control a process variable, and the selected controller assumes control of the process variable starting with its output at the limiting value. The tuning adjustment is implemented by combining the signal selected for controlling the process variable and a tuning factor for use as the reset feedback signal for the PI controller.

14 Claims, 4 Drawing Sheets

ANTI-RESET WINDUP FOR CONTROLLERS IN SELECTIVE CONTROL LOOPS

This invention relates to process controllers having proportional and integral control action. In one aspect the invention relates to apparatus for handling signals which are susceptible to sudden damage. More specifically the invention relates to an anti-reset windup (ARW) method for selective control loops in which the selected control signal is modified by an ARW tuning factor and then utilized as a reset feedback signal to prevent windup of unselected controllers.

Feedback controllers employing proportional-integral (PI) or proportional-integral derivative (PID) control action are well known for automatically controlling process variables such as pressure, temperature, flow, level, etc., which are susceptible to change but which can be measured and controlled. The control action of a PI controller is described by the relationship:

$$m = K_c \cdot e + K_c/\gamma_i \int_0^t e \cdot dt + p_s \qquad \text{(eq. 1)}$$

Where:
 $m$ = Controller output,
 $K_c$ = Controller gain,
 $p_s$ = constant,
 $Y_i$ = integral time constant, and
 $e$ = error = set point − measured process variable.

For automatic control of a process each controlled process variable must have at least one manipulated variable for the controller to act on. In many processes, however, the variables desired to be controlled outnumber the variables available for manipulation. When this happens, the control system must decide how to share the manipulated variables among the more numerous controlled variables.

Switching between controlled process variables can be easily and smoothly accomplished using selective devices called selects. Selects choose either the lowest, median or highest signal from among two or more signals. In control systems utilizing select devices a controller output may or may not be selected from among two or more signals to control a process variable. If a controller is not selected, it is in an open loop condition because an unselected controller lacks a process variable to manipulate. This means that there is no control action to drive the error term, designated e in equation 1, to zero and a phenomen called reset (or integral) windup occurs. In this situation the integral action of the controller causes it's output to continue to change as long as there is a deviation of the measured variable from the set point. Windup occurs when the error persists longer than it takes the intergal action to drive the controller to saturation. Reset windup also occurs when a controller cannot adjust its manipulated variable because manipulation is obstructed, for example by a closed valve, such as often occurs during a process startup, or by the controller output being intentionally limited to a safe value.

One solution to reset windup is to modifty the standard proportional-integral equation illustrated in equation 1, by adding a controller in the feedback circuit which can limit the controllers output to a high or low limit as desired. This method is commonly called a "batch" method in that it is normally required for controllers used to start up batch processes automatically.

A second common solution to reset windup which is employed when controllers are used with selects is known as the "external reset feedback" method. This is accomplished by using the output of the select as a common reset feedback signal to all controllers from which the selection was made. In this way a selected controller will have its own output feed back and therefore will have normal reset action. The other controllers in the system which require protection against windup will have a reset signal which is not their own output, thereby forcing the unselected controllers to respond like proportional controllers.

While the above described solutions for protecting against windup effectively prevent windup in a proportional-integral controller by limiting the protected controllers output, there is no provision for preventing overshoot or conversely preventing an overdamped response when the condition which caused the windup limiting is corrected and the normal controller resumes control starting with its output at a limited condition. For example the "external reset feedback" method almost always results in the controlled variable overshooting its set point when a condition which forced a windup protected controller against a limit, subsides. On the other hand the "batch unit" method of windup protection almost always results in an overdamped approach of the controlled variable to the set point after the condition which caused the windup limiting subsides.

Selective control loops are used in a variety of process situations for avoiding hazardous conditions by selecting an appropriate corrective action. Typically a normal control signal is overridden by a secondary controller that has a higher priority in the event of certain process conditions. For example, flooding in a distillation column can be prevented in a situation where the normal level controller which manipulates the bottom flow rate, is overridden by a secondary level controller which manipulates the feed rate, if the bottoms flow line becomes restricted.

In some processes, however, sudden selection of a controller output that is held at a limited value while the controller is unselected, must be avoided because the newly selected controller output will cause the controlled variable to overshoot the set point for the controlled variable or needlessly delay the return of the controlled variable to the set point. For example, in controlling solids concentration in a polymerization reaction, overshooting the solids concentration set point can be disastrous in that the reactor could become plugged. Another example where overshooting a set point cannot be tolerated is in surge control of a centrifugal compressor where the compressor can be put into surge on overshooting a pressure set point.

It is thus a primary object of this invention to provide an adjustable tuning factor for use with PI controllers in selective control loops where "external reset feedback" type ARW protection is provided. It is another object of this invention to modify the external feedback of a controller such that the controller responds in a manner similar to a critically damped controller when it resumes control of a process variable starting from an output limited condition. It is a further object of this invention to allow a process operator to adjust the amount of overshoot or undershoot obtainable when a select chooses a PI controller output to manipulate a process variable. It is a still further objective of the present invention to provide an ARW controller for use in selective control loops for controlling processes having hard constraints where overshooting of a set point cannot be tolerated.

In accordance with the present invention method and apparatus are provided for modifying the integral action of controllers for use in selective control loops. The integral mode modification embraces an adjustable ARW tuning factor which modifies the signal selected from among several controller output signals and/or output limit constants for the control signal to manipulate a process variable. Since a particular controller may or may not have its output selected as the control signal, the integral mode of the selected controller is unmodified and a selected controller will have normal reset action. However, an unselected controller will have its integral mode modified by its adjustable ARW tuning factor to limit its output and prevent reset windup. After modificaton by the adjustable tuning factor, the selected control signal is combined with the conventional feedback signal for integral action for each unselected controller associated with the selective control loop. The improvement in accordance with this invention is evident in the controlled variables approach to set point from a limited condition when a select device switches signals in a selective control loop and suddenly selects an output limited controller to control a process variable.

Other objects and advantages of the invention will be apparent from the description of the invention and the appended claims as well as from the detailed description of the drawing in which:

The invention is described in terms of particular function blocks which are suitable for implementation according to a position algorithm on a digital computer. However, the invention could also be implemented in terms of analog comparisons and analog circuits.

The method of this invention is particularly useful in control situations where a signal for controlling a process is selected by automatically selecting one signal as a process control signal from a group of signals which includes the output of a PI control. Such a group of signals which includes the output of at least one PI controller can include one or more limit constant signals representative of a safe value for a process variable, and the output from additional PI controllers. The selection of the process control signal from a group of signals can be a high select, a low select or a median select.

Figure 1:
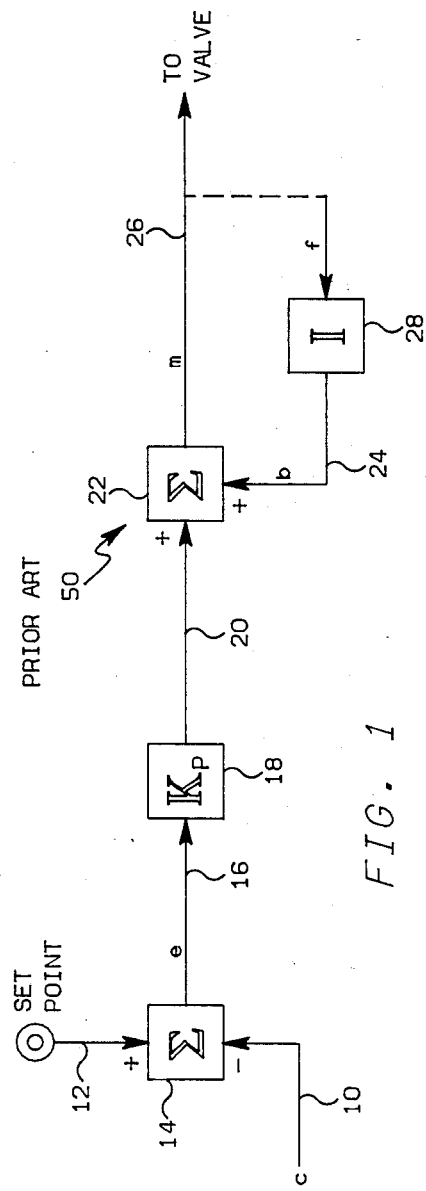
FIG. 1 is a diagrammatic representation of a PI controller from which the effect of windup can be visualized.

Referring now to the drawings and in particular to FIG. 1. there is illustrated a common configuration of a PI controller for implementing the control action described by equation 1. A measured process variable signal 10 and designated c on the drawings and a set point signal 12 are provided as inputs to summing block 14. The set point input 12 may be manually entered by an operator, or may be the output of a computation block, not illustrated. The process variable input 10 is an input representative of the process variable to be controlled and can be any process variable such as a temperature, pressure, flow, level, etc. which is susceptible to change but which can be measured and controlled.

Signal 10 is subtracted from Signal 12 in summing block 14 to establish signal 16 which is representative of the difference between set point signal 12 and the controlled variable signal 10. Signal 16 is the error term which is designated e in equation 1. Signal 16 is provided from summing block 14 as an input to computation block 18. The error signal 20 is multiplied by proportional constant $K_p$ in computation block 18 to establish signal 20 which is representative of the term $e \cdot k_p$ in equation 1. Signal 20 is provided as a first input to summing block 22. Signal 24 which is a feedback signal, as will be described more fully here and after, is provided as a second input to summing block 22. Signal 20 is summed with signal 24 in summing block 22 to establish signal 26 which is the controller output signal designated by the term m in equation 1.

The controller output 26 is provided to a final control element, which is typically a valve that is manipulated so as to drive the error signal 16 to zero. Signal 26 is also provided to computation block 28 which incorporates a first order lag function I having a time constant Y which is expressed in equation 1. Signal 26 is passed through the lag block 28 to establish signal 24, which is representative of the controller output 26 lagged by the time constant Y.

Integration is accomplished by the positive feedback of the controller output 26 through first order lag 28 which has a time constant Y. The effect of windup can be visualized by considering the reset feedback designated f in FIG. 1 which is modified by lag I to establish a positive feedback signal designated as b in FIG. 1. If the feedback loop is closed and e is not equal to zero, the controller output 26 will be driven continuously by the positive feedback signal b to its saturation limit. Windup is not complete, however, until the output of lag 28 is also at its saturation limit. Then even if the error signal 16 should suddenly return to zero, the controller output 26 will remain equal to the feedback signal 24 which is at the saturation limit. The feedback connection is shown as a broken line in FIG. 1 to indicate the desirability of breaking or modifying that line to provide an external reset signal input for a feedback signal f which can be input to the controller 50 from an external device to avoid windup.

Figure 2:
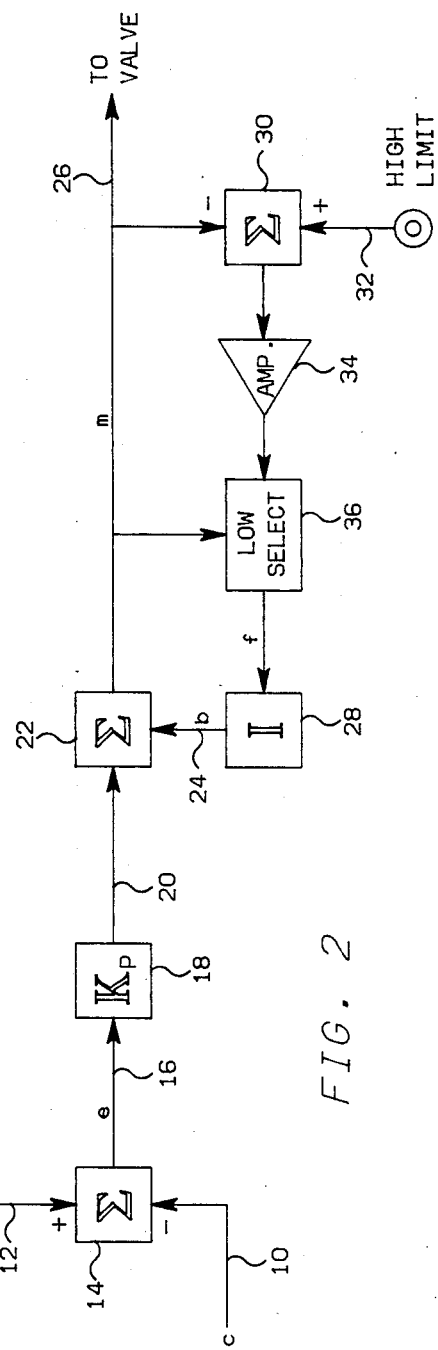
FIG. 2 is a diagrammatic representation of ARW limiting-for a batch unit.
Figure 3:
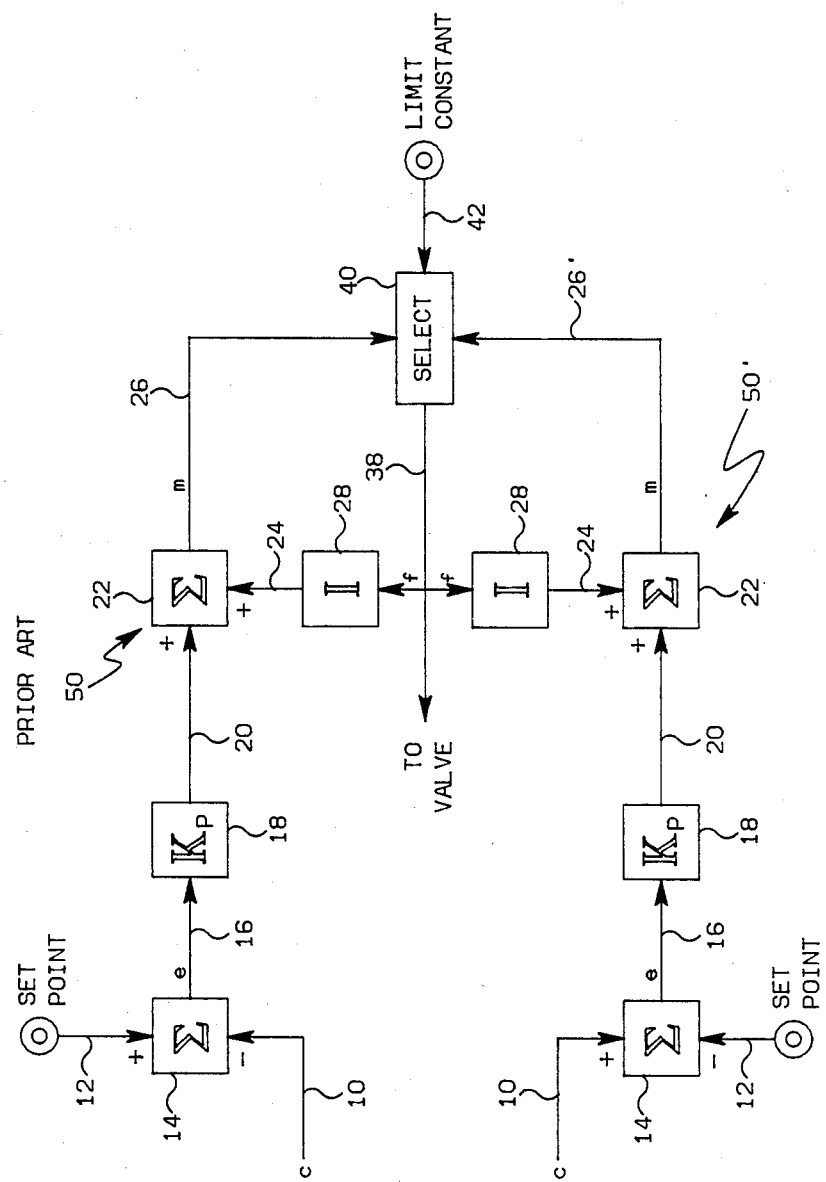
FIG. 3 is a diagrammatic representation of external feedback ARW limiting for a selective control loop.
Figure 4:
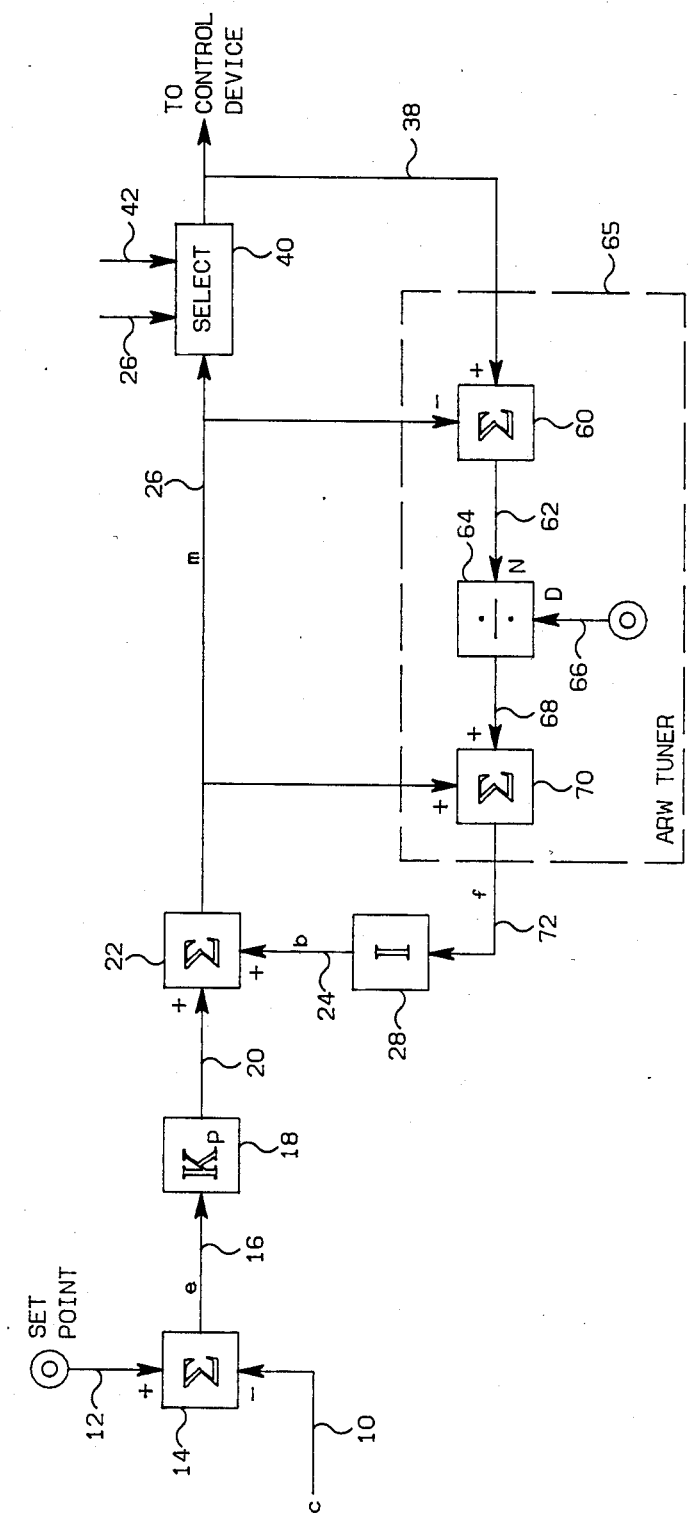
FIG. 4 is a diagrammatic representation of a PI controller in accordance with the invention.

Since FIGS. 2, 3 and 4 include all the computation blocks for the controller 50 illustrated in FIG. 1, a detailed description of the identical controller blocks will not be provided in connection with FIGS. 2, 3 and 4. Only the blocks utilized in connection with controller 50 to modify the controller output 26 and/or to provide an external reset feedback signal f will be described.

Referring now to FIG. 2, it is illustrated that the effect of windup can be moderated by including a high limit for controller output 26 which is provided through summation block 30, high gain amplifier 34, and low select 36, to the first order lag block 28. It is noted, however, that this limit cannot be set within the 0 to 100 percent control range without producing offset during normal operation. The ARW of FIG. 2 is known as a batch method which as previously stated has found utility for automatically starting batch processes.

As illustrated in FIG. 2 the broken line portion of signal 26, illustrated in FIG. 1, is modified in FIG. 2 to include summation block 30, high limit signal 32, high gain amplifier 34, and low select block 36. This arrangement of feedback computation blocks 30, 34 and 36 insures that the feedback signal f will not exceed the high limit signal 32 and therefore will halt integration provided by summing signal 24 and 20 in summation block 22 when the controller output signal 26 equals the high limit signal 32. While the batch method of ARW effectively moderates reset windup by limiting the controller output 26, it typically results in an excessively slow approach of the control variable 10 to the set point 12 when the output limited controller is selected to manipulate a valve and thereby decreases its error 16.

Referring now to FIG. 3, it is illustrated that the effective windup can also be moderated in selective control loops by providing an external signal from the output 38 of select 40 as a reset feedback signal f to two controllers generally indicated at 50 and 50' in FIG. 3. Select 40 selects one of the group of signals at its input. As illustrated in FIG. 3, the group of signals at the input of select 40 comprises the output of controllers 50 and 50' which are designated 26 and 26' and a limit constant 42 which represents a safe value for a process variable. In FIG. 3, the selected valve signal 38 is provided as a reset feedback signal f to each PI controller associated with select 40.

In contrast to the batch ARW method which typically results in an excessively slow return to the control variable to the set point for a newly selected controller, the external reset feedback illustrated in FIG. 3 typically results in a response which overshoots the set point.

Referring now to FIG. 4, there is illustrated external reset feedback for a PI controller where the reset feedback signal is an external signal obtained from select 40, and is then modified according to the invention. In the presently preferred embodiment the output 38 of select device 40 is provided as an input to the ARW tuner 65 and is a first input to summing block 60. Signal 26 which is representative of the controller output is provided as a second input to summing block 60. Signal 26 is substracted from signal 38 in summing block 60 to establish signal 62 which is representative of the deviation of the select output 38 from the controller output 26. Signal 62 is provided from summation block 60 as a first input to dividing block 64. Signal 66 which is representative of a number between 0 and 1 which can be utilized as a tuning adjustment for the response of controller output 26 signal 26, is provided as a second input to dividing block 64. Signal 62 is divided by signal 66 in dividing block 64 to establish signal 68 which is representative of a desired amplification of the deviation of the select output 38 from controller output 26 as represented by signal 62. Signal 68 is provided as a first input to summing block 70, and signal 26 is provided as a second input to summing block 70. Signal 68 is summed with signal 26 in summation block 70 to establish an adjustable reset feedback signal 72 which is designated f in FIG. 4. The reset feedback signal 72 is utilized with lag block 28 in the same manner as the reset feeback signal designated f in FIG. 1 is utilized with lag block 28 to produce integral control action on controller output signal 26.

Figure 5:
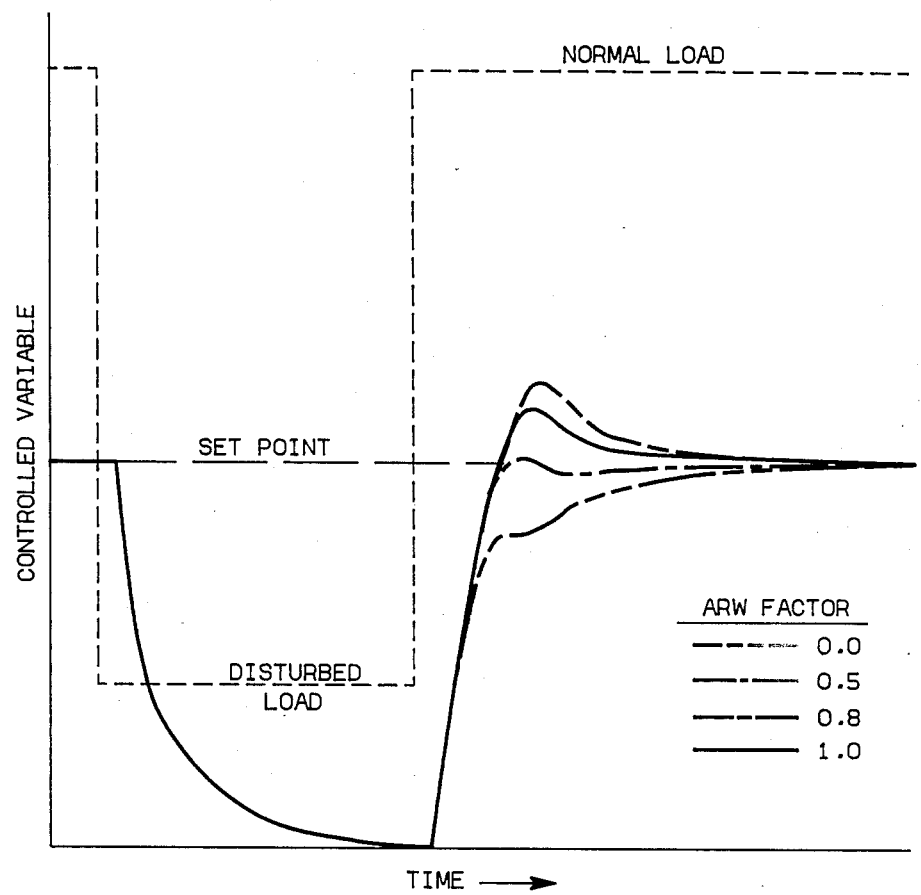
FIG. 5 is a graphical representation illustrating the control variables approached to set point in accordance with the invention illustrated in FIG. 4.

FIG. 5 compares the response of the controlled variable obtainable with various settings of the ARW tuning factor represented by signal 66, when a load disturbance which forced a PI controller against a limit subsides. It is evident from FIG. 5 that a value of 0.5 for signal 66 provides a response which is generally preferred for most controlled variables.

The invention has been described in terms of a preferred embodiment as illustrated in FIG. 4. The specific function block such as a first order lag, summer, and multiplier used to define a controller 50 and the selects, amplifiers, dividers and additional functions blocks associated with ARW protection are typically found in a library of user function blocks provided with a process control computer. The presently preferred process control computer for practice of the invention is the Optrol ® DCS computer from Applied Automation, Inc, Bartlesville, OK.

While the invention has been described in terms of the presently preferred embodiment reasonable variations and modifications are possible by those skilled in the art, within the scope of the described invention and the appended claims.

That which is claimed is:

1. Apparatus comprising:
   controller means for automatically generating an output signal in response to an error signal representative of the deviation of a processs variable signal from a set point and of the time integral of said error signal, wherein said output signal includes an integral part and a proportional part and wherein said controller means includes an external reset signal input;
   means for selecting a signal from a group of signals, which includes said output signal, to establish a selected signal wherein said selected signal is provided to a control element for said process variable;
   means for establishing an anti-reset-windup (ARW) tuning signal representative of a desired tuning factor;
   means for modifying said selected signal responsive to said ARW tuning signal to establish an adjustable reset feedback signal, wherein said selected signal provided to said control element is unaffected by said means for modifying said selected signal; and
   means for providing said adjustable reset feedback signal to said external feedback input of said controller means, wherein said integral part of said output signal responds to said adjustable reset feedback signal in addition to responding to said error signal.

2. Apparatus in accordance with claim 1 wherein said means for modifying said selected signal to establish an adjustable reset feedback signal comprises:
   means for establishing a first signal representative of the deviation of said output signal from said selected signal;
   means for dividing said first signal by said ARW tuning signal to establish a second signal; and
   means for summing said second signal and said output signal to establish said adjustable reset feedback signal.

3. Apparatus in accordance with claim 2 wherein said ARW tuning signal is representative of a number between zero and unity.

4. Apparatus in accordance with claim 1 wherein said means for selecting a signal is a high select.

5. Apparatus in accordance with claim 1 wherein said means for selecting a signal is a low select.

6. Apparatus in accordance with claim 1 wherein said process variable signal is representative of the solids concentration in a polymerization reaction.

7. Apparatus in accordance with claim 1 wherein said process variable signal is representative of a measured pressure rise across a compressor.

8. A method for obtaining a desired response for a controlled variable in a selective control loop wherein a selected signal is provided to a control element to control a process variable and wherein a select switches signals and suddenly selects an output signal of a PI controller to control said process variable, said output signal having a proportional part and an integral part responsive to an error signal, said PI controller having an external reset feedback input, and wherein said output signal is at a limiting value when selected by said select, said method comprising the following steps which are performed prior to selecting said output signal of said PI controller to control said process variable:
establishing an anti-reset-windup (ARW) tuning signal representative of a desired tuning factor;
modifying said selected signal responsive to said ARW tuning signal to establish an adjustable reset feedback signal, wherein said selected signal provided to said control element is unaffected by said step of modifying said selected signal; and
providing said adjustable reset feedback signal to said external reset signal input of said PI controller, wherein said integral part of said output signal responds to said adjustable reset feedback signal in addition to responding to said error signal.

9. A method in accordance with claim 8 wherein said step of modifying said selected signal to establish an adjustable reset feedback signal comprises:
establishing a first signal representative of the deviation of said output signal from said selected signal;
dividing said first signal by said ARW tuning signal to establish a second signal representative; and
summing said second signal and said output signal to establish said adjustable reset feedback signal.

10. A method in accordance with claim 9 wherein said ARW tuning signal is representative of a number between zero and unity.

11. A method in accordance with claim 8 wherein said select is a high select.

12. A method in accordance with claim 8 wherein said select is a low select.

13. A method in accordance with claim 8 wherein said process variable is representative of the solids concentration is a polymerization reaction.

14. A method in accordance with claim 8 wherein said process variable is representative of a measured pressure rise across a compressor.

* * * * *